United States Patent Office 3,052,714
Patented Sept. 4, 1962

3,052,714
PROCESS FOR THE PURIFICATION OF LIQUIDS
Harry Joseph Brodie, Closter, N.J., assignor to E. I. du Pont de Nemours and Company, Wilmington, Del., a corporation of Delaware
No Drawing. Filed Apr. 4, 1961, Ser. No. 100,524
16 Claims. (Cl. 260—485)

This invention relates to a process for the removal of impurities from essentially nondistillable liquids. More particularly, it relates to the removal of copper salts and acidic compounds from olefinically unsaturated addition polymerizable liquids.

The standard method of preparing the unsaturated esters of polyols, particularly such esters of the alpha-methylene carboxylic acids, e.g., polyethylene glycol diacrylates prepared from diol precursors having average molecular weights of 200 to 600, is by a direct esterification reaction. The reaction is generally carried out in the presence of acid catalysts and metallic compounds, e.g., cuprous oxide, cuprous chloride and other cuprous salts, as thermal polymerization inhibitors. The acid catalysts and metallic salts present are undesirable except in very minute quantities. This is true, in particular, when the unsaturated esterification product is used in the preparation of photopolymerizable compositions. Since the ester product is essentially nondistillable (except under very extreme conditions with the use of special equipment), the undesirable materials present cannot be removed by distillation. Various methods are known for removing the copper and acid impurities from the unsaturated ester. Many of these procedures use several aqueous extractions, e.g., brine, brine-carbonate, aqueous ammonia, etc. While satisfactory results are obtained using aqueous extractions, these techniques have several disadvantages, e.g., they require large volumes of aqueous solution, they are time consuming, they may interfere with efficient solvent recovery and they present an acute waste disposal problem.

An object of this invention is to provide a simple and effective process for removing acid and copper impurities from diesters prepared from polyols and acrylic (alpha-methylene carboxylic acids) and alpha-substituted acrylic acids. Another object is to provide such a process which is economical and does not result in significant hydrolysis of the dieester. Yet other objects are to provide such a process which essentially eliminates the waste disposal problem and facilitates solvent recovery. A further object is to provide such a process which results in dieesters of sufficient purity to be useful in making high quality photopolymerizable layers for making photopolymerized printing elements. Still further objects will be apparent from the following description of the invention.

The above objects are accomplished according to the present invention by treating an azeotropic organic solvent solution of an alpha-methylene monocarboxylic diester of a polyol having an average molecular weight of not more than 600 taken from the group consisting of polyhydric alcohols of 2 to 6 carbon atoms and polyethylene and polypropylene glycols, said solution containing copper and acidic impurties, with (1) a copper precipitating compound taken from the group consisting of alkali metal oxalates and sulfides, barium oxalate and hydrogen sulfide and (2) a basic compound taken from the group consisting of alkali metal carbonates and bicarbonates, and alcoholates, controlling the pH of a dilute aqueous filtered sample (4 grams per 20 grams of water) within the range of about 5 and 8, physically removing the precipitated copper compound from the solvent solution and subsequently removing the volatile components from the filtrate to obtain the non-volatile diester as the residue.

The treatment is preferably carried out stepwise with or without filtering. By way of illustration, to the crude diester solution is added a compound containing an anion capable of precipitating copper, e.g., an oxalate and sulfide, the solution is optionally filtered, and a basic compound, e.g., a carbonate or bicarbonate, is added to remove the acidic impurities present. When a sulfide copper precipitating compound is used, the copper precipitating compound and the basic compound can be added simultaneously to the crude organic solution, or the basic compound can be added prior to the addition of the sulfide compound. In general, the amount of copper is reduced to less than 1.5 parts per million.

As an exemplary procedure, an alpha-methylene carboxylic acid diester, e.g., a polyethylene glycol diacrylate whose diol precursor had an average molecular weight of about 300 to 600, is prepared by direct esterification of the glycol and acrylic acid by refluxing the mixture (using a moisture trap) in the presence of sulfuric acid as the catalyst, benzene as the azeotroping agent and solvent and copper powder and cuprous oxide as the inhibitors. To a solution of the reaction product cooled to room temperature is added pulverized potassium oxalate monohydrate and the mixture is slurried for about 2 hours. After the solids are removed by filtration, powdered sodium carbonate is added and the mixture is slurried again, for about 4 hours. The pH of a 4 g. filtered sample per 20 g. of water is between 5 and 8. The solids are removed by filtration and the filtrate vacuum evaporated to remove residual benzene and water. The purified product is then useful for the preparation of photopolymerizable compositions such as are described in Plambeck U.S. Patents 2,760,863 and 2,791,504, Martin and Barney U.S. Patent 2,927,022, Munger U.S. Patent 2,923,673 and Notley U.S. Patent 2,951,758.

The invention will be further illustrated by, but is not intended to be limited to the following examples:

Example I

A mixture of 300 g. of polyethylene glycol having an average molecular weight of 300, 144 g. of glacial acrylic acid, 1.0 g. of copper powder, 0.1 g. of cuprous oxide, 3.68 g. of concentrated sulfuric acid (specific gravity 1.84) and 100 ml. of benzene was refluxed in a 3-neck flask fitted with a moisture trap and condenser until at least 95 percent of the theoretical water was collected (34.2 to 36 g.). The solution was then cooled to room temperature. To 425 ml. of the above solution was added 63 g. of pulverized potassium oxalate. The mixture was slurried for two hours, and the solids present were removed by vacuum filtration. To a 0.5 ml. portion of the filtrate was added an equal volume of concentrated ammonia, no color change (to blue) was noted indicating that no more than about 1.5 p.p.m. of copper ions were present. To the remainder of the filtrate was added 62 g. of powdered sodium carbonate and the mixture was slurried for four hours. The pH of a filtered portion of the solution consisting of 4.0 g. added to 20 ml. of distilled water was 6.7. The solid present was removed by filtration, and the filtrate was vacuum evaporated for 45 minutes at 50° C. and 20 mm. pressure to remove residual benzene and water. The yield of polyethylene glycol diacrylate was 320 g. (80% yield), the bromination equivalent was determined as 111, the saponification equivalent was 210, the viscosity at 23° C. was 45 centipoises and the pH in aqueous solution (4.0 g. added to 20 ml. of distilled water) was 6.3.

To 215 g. of the purified polyethylene glycol diacrylate, prepared as described above, in a 5-quart planetary mixer, was added 0.2 g. of anthraquinone, 0.2 g. of p-methoxyphenol and 0.2 g. of mucochloric acid. Two hundred and eight g. of cellulose hydroacetate, which had been finely pulverized in a mechanical pulverizer so that the particles could pass through a screen with 0.010-inch openings, and 120 g. of succinic anhydride were added to the polyethylene glycol diacrylate in the mixer and the materials weer mixed for 5 minutes. The mixture was placed on a 6-inch by 13-inch rubber mill the rolls of which were internally heated by steam and was admixed at 125° C. for 5 minutes and was allowed to dry for 5 minutes. Twenty g. of cellulose hydroacetate (pulverized) and 30 g. of diethylcyclohexylamine were added to the mixture on the mill over a 5-minute period and were allowed to work into the mixture by milling for an additional 8 minutes at 140 to 150° C. The photopolymerizable composition prepared on the mill was formed into a clear, translucent sheet, 40 mils thick, by pressing for 3 minutes at 170° C. under a pressure of 1,000 pounds per square inch. The pressed sheet was laminated to a sheet of steel, 12 mils thick, by the procedure described in Example 5 of assignee's Belgian Patent 580,820 The resultant element was placed in a vacuum frame, and a line process negative was brought into contact with the polymer surface. The vacuum frame containing the element and negative was placed beneath an 1800-watt high-pressure mercury-arc, and the element was exposed to 1.75 watts of actinic radiation per square inch for 14 seconds. After exposure, the negative was stripped from the element surface, and the unexposed polymer was removed by spray-washing for 9 minutes using a 0.04 N aqueous solution of NaOH. A printing element having a clear, relief image firmly bonded to the base and corresponding to the clear areas of the negative was obtained. The printing showed excellent image quality when used for printing on a flat-bed press.

*Example II*

A mixture of 300 g. of polyethylene glycol 300 described in Example I, 144 g. of glacial acrylic acid, 1.0 g. of copper powder, 0.1 g. of cuprous oxide, 3.68 g. of concentrated sulfuric acid and 100 ml. of benzene was refluxed as described in Example I and was cooled to room temperature. To 10 ml. of the above solution was added 1.0 g. of powdered sodium carbonate. The solution was stirred for 4 hours and hydrogen sulfide gas was bubbled into the solution for about 30 minutes (until no further black percipitate formed). The solid present was removed by vacuum filtration, and the filtrate was vacuum evaporated for 45 minutes at 50° C. and 20 mm. pressure to remove residual benzene and water. The bromination equivalent of the purified polyethylene glycol diacrylate was determined as 107; the saponification equivalent was 216.

*Example III*

To 20 ml. of the crude polyethylene glycol diacrylate benzene solution prepared in Example II was added 1.0 g. of $Na_2S \cdot 9H_2O$, and the mixture was slurried for one hour and was filtered. Two grams of $KHCO_3$ was added and the mixture was slurried for 3 hours. The pH of a filtered aqueous portion of the solution (4.0 g. per 20 ml. of distilled water) was 5.2. The solid present was removed by vacuum filtration, and the filtrate was vacuum evaporated as described in Example I to remove residual benzene and water. The pH of an aqueous sample (4.0 g. per 20 ml. of water) of the purified product was 5.2.

*Example IV*

To 217 ml. of the crude polyethylene glycol diacrylate benzene solution prepared in Example II was added 50 g. of pulverized potassium oxalate monohydrate, and the mixture was slurried for 3 hours. Twenty grams of sodium carbonate was added to the slurried mixture and the slurrying was continued for an additional 7 hours. The pH of a filtered 4.0 g. sample mixed with 20 ml. of water was 6.4. The solid was removed by vacuum filtration and the filtrate was vacuum evaporated as described in Example I to remove residual benzene and water. The pH of an aqueous sample of the product determined as described in Example I, was 5.3, the bromination equivalent was 117 and the saponification equivalent was 220.

*Example V*

A crude benzene solution of polyethylene glycol diacrylate was prepared as described in Example I except that 400 g. of polyethylene glyocl having an approximate average molecular weight of 400 was used as one of the starting raw materials. The purification procedure described in Example I was followed. The yield of purified polyethylene glycol diacrylate 400 was 417 g. (82% yield).

The purified diesters prepared as described in Examples II to V were used to make photopolymerized printing elements as described in Example I, comparable results being obtained.

The unsaturated esters which can be purified by the present process, i.e., those prepared by the reaction of a polyol having an average molecular weight of up to about 600 and alpha-methylene carboxylic acid, include preferably triethylene glycol diacrylate and polyethylene glycol diacrylates (molecular weight of the diol precursor of up to 600). In addition, the following unsaturated esters can be purified, e.g., those esters having a plurality of addition polymerizable ethylenic linkages, particularly when present as terminal linkages, and especially those wherein at least one and preferably most of such linkages are conjugated with a doubly bonded carbon, including carbon doubly bonded to such heteroatoms as nitrogen, oxygen and sulfur. Outstanding are such materials wherein the ethylenically unsaturated groups, especially the vinylidene groups, are conujugated with ester structures. The following specific compounds are further illustrative of this class: Unsaturated esters of polyols, particularly such esters of the alpha-methylene carboxylic acids, e.g., ethylene diacrylate, diethylene glycol diacrylate, glycerol diacrylate, glycerol triacrylate, ethylene dimethacrylate 1,3-propylene dimethacrylate, 1,2,4-butanetriol trimethacrylate, 1,4-cyclohexanediol diacrylate, 1,4-benzenediol dimethacrylate, pentaerythritol tetramethacrylate, 1,3-propylene diacrylate, 1,5-pentanediol dimethacrylate, the bis-acrylates and methacrylates of polyethylene glycols of molecular weight 200 to 600, and the like. Outstanding esters are prepared wherein the molecular chain between the hydroxyls of the polyols is solely carbon or oxygen-interrupted carbon.

To aid in the reaction, thermal polymerization inhibitors, esterification catalysts, azeotrope agents and solvents are present.

Suitable copper thermal polymerization inhibitors which can be used during the esterification reaction include copper powder, cuprous oxide, cuprous halides, e.g., chloride and bromide, etc. Useful acid esterification catalysts are sulfuric acid and p-toluene sulfonic acid.

Compounds which are useful during the esterification reaction as azeotroping agents and solvents which form mixtures of constant boiling point with water include hydrocarbons, e.g., benzene, ethylbenzene, toluene, xylene, cyclohexane; alkanes, e.g., heptane; halogenated aliphatic hydrocarbons of 1 to 4 carbon atoms, e.g., ethylene chloride, propylene chloride, dichloromethane, 1,2-dichloroethane, dichloroethylene, 1-chloropropane, 2-chloropropane, 1,2-dichloropropane, chloroform, trichloroethylene, 1-chloro-2-methylpropane, 1-chlorobutane, bromoethane, iodoethane; ethers, e.g., diethyl ether, diisopropyl ether, isobutyl ether, diphenyl ether, phenetole, anisole, mesityl oxide, dioxane; ketones, e.g., methyl ethyl ketone, methyl-n-propyl ketone, and methyl isobutyl ketone. Other azeotropic agents can be used provided they do not react with the esterification reaction components, e.g., the glycol, acid or ester formed. The azeotropic mixtures should boil at 120° C. and less and preferably at 100° C. and less.

The copper inhibitor and acidic impurities can be removed from the crude glycol diester solution by means of a one or two step embodiment of the process. In the preferred two step process, the copper inhibitor is removed first. Compounds useful in removing the inhibitor include alkali metal oxalates and sulfides, e.g., sodium, potassium and lithium, and barium oxalate from the alkaline earth metals, and hydrogen sulfide. The acidic components can be removed by adding alkali metal carbonates and bicarbonates, e.g., sodium, potassium and lithium, and sodium methoxide to the crude diester solution. The basic compound can be added before the copper precipitating compound if the latter compound is a sulfide. The oxalates remove copper more efficiently from solutions of low pH and best results are obtained when they are added prior to neutralization with the basic compound. In the single step embodiment, the copper precipitating compound and basic compound are added to the crude diester solution simultaneously. The sulfide compounds give satisfactory results with the single step embodiment. The oxalate compounds, apparently due to the formation of soluble copper complexes in the more basic solution, do not give as satisfactory results if added with the basic compound.

The crude diester solution must be slurried with the purifying agents for a period of time sufficient to remove the acid and copper. The contact times which readily can be determined by those skilled in the art vary with the amount of copper present, the particular compounds used, the rate of stirring and degree of subdivision of the compounds.

The invention is useful for the purification of unsaturated esters prepared from polyols and alpha-methylene carboxylic acid in the presence of a copper thermal polymerization inhibitor and acid catalyst. The purified ester which is addition polymerizable in the presence of actinic radiation can be used with polymeric filler and initiator components to prepare photopolymerizable compositions and printing plates of the types described in Plambeck U.S. Patents 2,760,863 and 2,791,504, Martin and Barney, U.S. Patent 2,927,022, Munger U.S. Patent 2,923,673 and Notley U.S. Patent 2,951,758. The purified ester can also be used in thermal transfer polymerization systems such as those described in assignee's Belgian patent specifications 593,834, 594,909 and 596,694. The purified addition polymerizable ester is a primary component of a photosetting adhesive, as in the preparation of safety glass, for example, for the production of photo-crosslinked plastics, and for the application of raised designs to surfaces. In addition, the photopolymerizable compositions are useful for affixing phosphors to surfaces to provide color television screens, or to form indicia on instrument panels.

The instant process is advantageous because by quick, simple operations the acid and copper impurities in the unsaturated ester product are reduced to negligible amounts. The process eliminates the use of extraction purification operations in the preparation of addition polymerizable ethylenically unsaturated compounds thereby reducing the volume of materials required for purification, the amount of waste liquors, the labor required. The process also facilitates solvent recovery. As a result of these advantages, the process permits a significant saving of time and cost.

What is claimed is:

1. A process for the purification of an alpha-methylene monocarboxylic acid diester of a polyol having an average molecular weight or not more than 600 taken from the group consisting of polyhydric alcohols of 2 to 6 carbon atoms and polyethylene and polypropylene glycols which comprises treating an azeotropic organic solvent solution of said diester containing copper and acidic impurities with (1) a copper precipitataing compound taken from the group consisting of alkali metal sulfides and hydrogen sulfide and (2) a basic compound taken from the group consisting of alkali metal carbonates and bicarbonates and sodium methoxide, until precipitation of the copper compound is complete and the pH of a 4.0 gram filtered sample of said treated solution per 20 grams of water is between 5.0 and 8.0, physically removing the precipitated copper compounds from the solvent solution and the residual solvent by evaporation thereby obtaining an alpha-methylene monocarboxylic acid diester of a polyol containing less than 2 parts per million of copper impurity.

2. A process as defined in claim 1 wherein said azeotropic solvent is benzene.

3. A process as defined in claim 1 wherein treatment (2) occurs before treatment (1).

4. A process as defined in claim 1 wherein treatments (1) and (2) occur simultaneously.

5. A process as defined in claim 1 wherein the precipitated copper compound is removed by filtration.

6. A process as defined in claim 1 wherein the diester solution treated with the copper precipitating compound is filtered to remove precipitated copper compound prior to the treatment of said solution with the basic compound.

7. A process as defined in claim 1 wherein said diester is a diacrylate.

8. A process as defined in claim 1 wherein said copper precipitating compound is sodium sulfide.

9. A process as defined in claim 1 wherein said basic compound is sodium carbonate.

10. A process for the purification of an alpha-methylene monocarboxylic acid diester of a polyol having an average molecular weight of not more than 600 taken from the group consisting of polyhydric alcohols of 2 to 6 carbon atoms and polyethylene and polypropylene glycols which comprises treating an azeotropic organic solvent solution of said diester containing copper and acidic impurities in order with (1) an alkali metal oxalate as a copper precipitating compound and (2) a basis compound taken from the group consisting of alkali metal carbonates and bicarbonates and sodium methoxide, until precipitation of the copper compound is complete and the pH of a 4.0 gram filtered sample of said treated solution per 20 grams of water is between 5.0 and 8.0, physically removing the precipitated copper compound from the solvent solution and the residual solvent by evaporation thereby obtaining an alpha-methylene monocarboxylic acid diester of a polyol containing less than 2 parts per million of copper impurity.

11. A process as defined in claim 10 wherein said copper precipitating compound is potassium oxalate.

12. A process for the purification of an alpha-methylene monocarboxylic acid diester of a polyol having an average molecular weight of not more than 600 taken from the group consisting of polyhydric alcohols of 2 to 6 carbon atoms and polyethylene and polypropylene glycols which comprises treating an azeotropic organic solvent solution of said diester containing copper and acidic impurities in order with (1) barium oxalate as a copper precipitating compound and (2) a basic compound taken from the group consisting of alkali metal carbonates and bicarbonates and sodium methoxide, until precipitation of the copper compound is complete and the pH of a 4.0 gram filtered sample of said treated solution per 20 grams of water is between 5.0 and 8.0, physically removing the precipitated copper compound from the solvent solution and the residual solvent by evaporation thereby obtaining an alpha-methylene monocarboxylic acid diester of a polyol containing less than 2 parts per million of copper impurity.

13. In a process for preparing a purified alpha-methylene monocarboxylic acid diester containing less than 2 parts per million of copper impurity from a polyol having an average molecular weight of not more than 600 taken from the group consisting of polyhydric alcohols of 2 to 6 carbon atoms and polyethylene and polypropylene glycols and an alpha-methylene monocarboxylic acid, including refluxing said polyol and acid in the presence of at least one copper-containing inhibitor taken from the group consisting of finely divided copper, cuprous oxide, cuprous chloride and cuprous bromide in an azeotropic organic solvent solution until at least 95 percent of the water is removed and cooling said solution, the improvement characterized by treating said cooled solution with (1) a copper precipitating compound taken from the group consisting of alkali metal sulfides and hydrogen sulfide and (2) a basic compound taken from the group consisting of alkali metal carbonates and bicarbonates and sodium methoxide, until precipitation of the copper compound is complete and the pH of a 4.0 gram filtered sample of said treated solution per 20 grams of water is between 5.0 and 8.0, physically removing the precipitated copper compound from the solvent solution and the residual solvent by evaporation.

14. A process as defined in claim 13 wherein said azeotropic solvent is benzene.

15. A process as defined in claim 13 wherein said diester is a diacrylate.

16. In a process for preparing a purified alpha-methylene monocarboxylic acid diester containing less than 2 parts per million of copper impurity from a polyol having an average molecular weight of not more than 600 taken from the group consisting of polyhydric alcohols of 2 to 6 carbon atoms and polyethylene and polypropylene glycols and an alpha-methylene monocarboxylic acid, including refluxing said polyol and acid in the presence of at least one copper-containing inhibitor taken from the group consisting of finely divided copper, cuprous oxide, cuprous chloride and cuprous bromide in an azeotropic organic solvent solution until at least 95 percent of the water is removed and cooling said solution, the improvement characterized by treating said cooled solution in order with (1) a copper precipitating compound taken from the group consisting of an alkali metal oxalate and barium oxalate and (2) a basic compound taken from the group consisting of alkali metal carbonates and bicarbonates and sodium methoxide, until precipitation of the copper compound is complete and the pH of a 4.0 gram filtered sample of said treated solution per 20 grams of water is between 5.0 and 8.0, physically removing the precipitataed copper compound from the solvent solution and the residual solvent by evaporation.

No references cited.

UNITED STATES PATENT OFFICE
CERTIFICATE OF CORRECTION

Patent No. 3,052,714                                September 4, 1962

Harry Joseph Brodie

It is hereby certified that error appears in the above numbered patent requiring correction and that the said Letters Patent should read as corrected below.

Column 2, line 71, for "eight" read -- eighty --; column 3, line 4, for "weer" read -- were --; column 4, line 9, for "glyocl" read -- glycol --; column 6, line 37, for "basis" read -- basic --.

Signed and sealed this 25th day of December 1962.

(SEAL)
Attest:

ERNEST W. SWIDER                                DAVID L. LADD
Attesting Officer                                    Commissioner of Patents